United States Patent [19]

Price

[11] Patent Number: 4,497,617
[45] Date of Patent: Feb. 5, 1985

[54] OPTICAL SYSTEM UTILIZING A VARIABLE FOCAL LENGTH REFLECTOR LENS

[75] Inventor: Edgar E. Price, Webster, N.Y.

[73] Assignee: Xerox Corporation, Stamford, Conn.

[21] Appl. No.: 417,786

[22] Filed: Sep. 13, 1982

[51] Int. Cl.³ .................... G02B 15/14; G02B 17/00
[52] U.S. Cl. ..................................... 350/425; 355/57; 355/60
[58] Field of Search .............. 350/425, 446, 427; 355/57, 60

[56] References Cited

U.S. PATENT DOCUMENTS

| | | | |
|---|---|---|---|
| 3,101,644 | 8/1963 | Lopez-Henriquez | 88/16.6 |
| 3,451,752 | 6/1969 | Frank | 355/8 |
| 3,609,024 | 9/1971 | Suzuki | 355/60 |
| 3,630,599 | 12/1971 | Donnel | 350/184 |
| 3,701,587 | 10/1972 | Kojima | 350/202 |
| 3,837,743 | 9/1974 | Amemiya | 355/57 |
| 3,936,152 | 2/1976 | Aurin et al. | 350/202 |
| 4,056,308 | 11/1977 | McCrobie | 350/184 |
| 4,061,419 | 12/1977 | Price et al. | 350/184 |
| 4,171,870 | 10/1979 | Bruning et al. | 350/173 |
| 4,281,907 | 8/1981 | Kamata | 350/427 |

OTHER PUBLICATIONS

New Lenses-New Principles of Lens Designs; Lecture to 76th meeting of German Ass'n. of Applied Optics: May 1975, Carl Zeiss.

*Primary Examiner*—John K. Corbin
*Assistant Examiner*—Paul M. Dzierzynski

[57] ABSTRACT

An optical system utilizes a variable focus half-lens reflector system for projecting images onto an image plane without the use of folding mirrors. The half lens is arranged with its optical axis parallel to the object and image planes. Attached to the entrance face of the lens is a pair of reflectors arranged to form a right angle which is bisected by the lens optical axis. Principal rays from an object are then reflected from the first mirror, reflected again from the back of the half lens, thus passing twice through the lens and then, via a final reflection from the second attached mirror, onto the image plane.

3 Claims, 7 Drawing Figures

OPTICAL SYSTEM UTILIZING A VARIABLE FOCAL LENGTH REFLECTOR LENS

BACKGROUND AND PRIOR ART STATEMENT

This invention relates to a variable magnification, or zoom lens, and more particularly to a reflector zoom lens for projecting an image of an object on a fixed object plane onto a fixed image plane.

The operation of a zoom lens can be thought of as involving two separate functions, though they occur simultaneously. First, the entire lens is generally moved relative to the object and image to change magnification in accordance with the relationship:

Magnification = $s'/s$ wherein: s = object distance, s' = image distance

Second, compensation is made within the lens to refocus, or maintain in focus, the lens in accordance with the following relationship $(1/s) + (1/s') = 1/f$ wherein: f = lens focal length. The purpose of refocusing is to maintain $s' + s$ at a constant value for all magnifications.

The compensation in focal length, step two mentioned above, is generally made by movement of one or more of the lens elements within or relative to the lens group.

U.S. Pat. Nos. 3,630,599 and 4,061,419 disclosed representative zoom lens constructions including matched groupings of lenses symmetrically positioned on both sides of a central aperture stop. These lenses are referred to as "full" zoom lenses.

An improved zoom lens which operates with fewer lens elements is disclosed in U.S. Pat. No. 4,056,308. For this type of lens construction, an outer fixed element is arranged symmetrically along the optical axis with a movable lens pair. At the back of the lens is a mirror which folds the optical axis back through the movable and fixed lenses. With this configuration, referred to as a "half" zoom lens, the object and image planes will be on the same side of the half zoom lens. As shown in the '308 patent, at unity magnification, the object and image planes are co-planar; if the lens elements are repositioned for reduction, the image plane will move closer to the lens. For the half zoom lens to be useful in a system where, for example, a document is to be exposed at an image plane located on the other side of the zoom lens, a system of mirrors must be used to fold the image emerging from the half zoom lens back in the original direction of travel.

It would be desirable, therefore to utilize a reflector lens to take advantage of the simplified construction while yet minimizing the requirement for positioning additional folding mirrors in an optical system. The present invention therefore, is directed towards a reflector zoom lens which does not require the use of folding mirrors to redirect a projected image towards an image plane. More particularly, the invention is directed to a variable magnification lens assembly comprising:

a variable magnification lens including the following elements in alignment along the lens optical axis;

a fixed outer lens element, at least one movable lens element spaced from said outer element and movable along said optical axis, and a reflector spaced from said movable element, said lens further including a first and second reflective element positioned proximate to said fixed outer lens element, said reflective elements joined together to form a right angle, said optical axis intersecting said angle.

DRAWINGS

DESCRIPTION

Figure 1A:
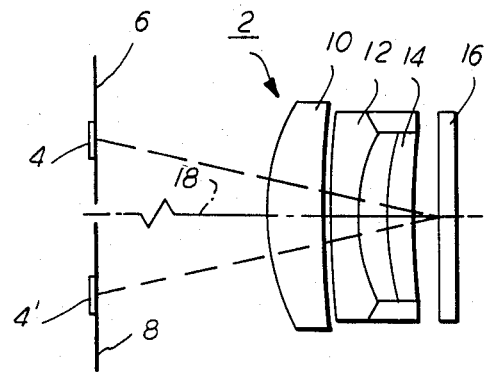
FIG. 1a is a prior art optical system showing a zoom reflector lens in a unity magnification position between movable conjugate planes.
Figure 1B:
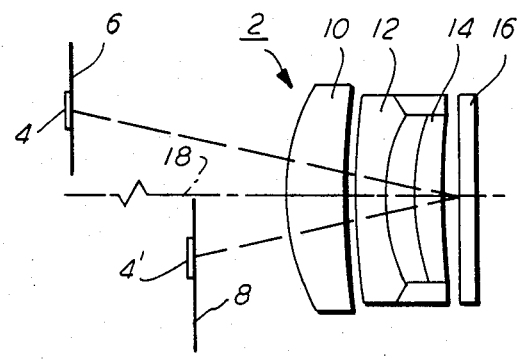
FIG. 1b shows the lens of FIG. 1 in a reduction position.

FIGS. 1a and 1b represent a prior art variable focal length reflector lens positioned in an optical system having a pair of conjugate planes on the object side of the lens. As shown in FIG. 1a, a lens 2 is positioned so as to project an image of object 4 on object plane 6 as image 4' on image plane 8 at unity magnification. Lens 2 includes lens elements 10, 12, 14 and a first surface reflector 16 in optical alignment with optical axis 12. The entire lens 2 and one or both of the conjugate planes are disposed for relative movement to change magnification. Within lens 2, elements 12 and 14 are fixed to one another and movable as a pair to adjust the lens focal length during a magnification change. For a reduction mode, as shown in FIG. 1b, the object plane 6 is moved away from lens 2 while the image plane 8 is moved closer. Lens pair 12, 14 has moved away from element 10 to maintain the image in focus.

Figure 2:
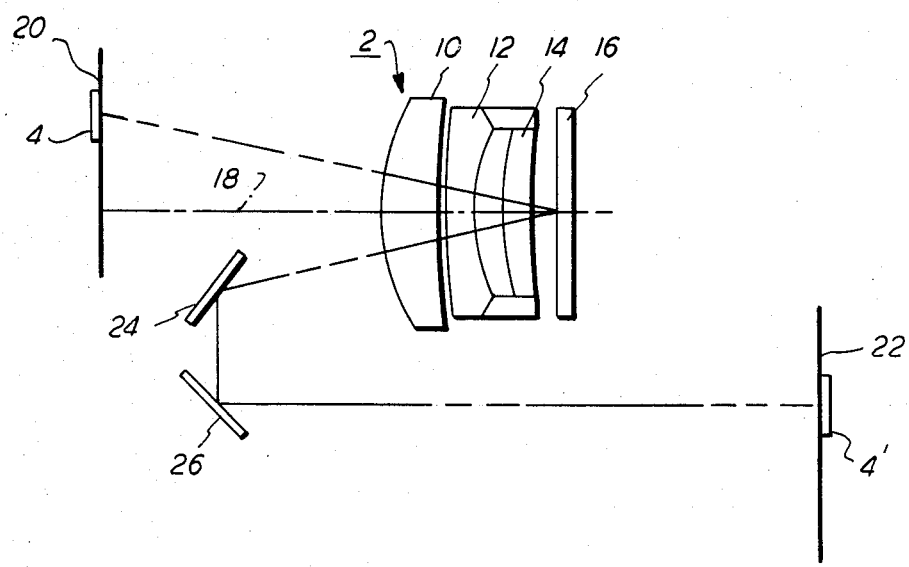
FIG. 2 shows the lens of FIG. 1 in an optical system with fixed conjugate planes and using mirrors for folding the optical axis.

FIG. 2 shows the lens of FIG. 1 in an optical system where the object plane 20 and image plane 22 must be in fixed positions. For this type of system, at least one pair of folding mirrors 24, 26 must be utilized to redirect the projected image towards the image plane. This system also adds to the space requirements needed to accommodate the additional elements and requires precise positioning of the folding mirrors.

Figure 3:
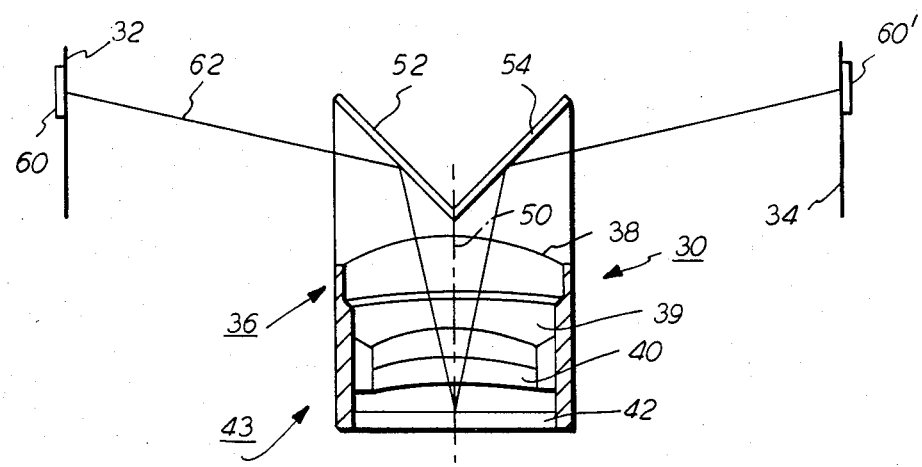
FIG. 3 shows the lens assembly of the present invention in an unfolded optical system with fixed conjugate planes.

FIG. 3 shows the reflector lens assembly 30 of the present invention, positioned between a fixed object plane 32 and a fixed image plane 34. Assembly 30 is shown equidistant from the conjugate planes in a 1X magnification position. Assembly 30 includes a lens 36 comprising a front positive crown element 38, a negative flint element 39, a meniscus element 40 and a reflector 42. Elements 39 and 40 are movable as a pair. All of the lens elements are aligned symmetrically along the optical axis 50 of lens 36 and enclosed within a housing 43. Completing lens assembly 30 are a pair of plane mirrors 52, 54 aligned closely to the face of element 38.

The mirrors are orthogonal to each other forming equal angles to axis 50.

Light reflected from an illuminated object 60, is represented by a principal ray along system optical axis 62. The ray is reflected from first mirror 52, is acted upon by lens elements 38, 39, 40, reflected from reflecting mirror 42 and is projected back through elements 40, 39 and 38. The principal ray is redirected by second mirror 54 towards the image plane 34 forming image 60'.

From the above description, it is apparent that lens assembly 30 comprises a compact half-zoom variation which affords a system design very simple means for achieving the desired magnification. By simply moving the assembly 30 in a horizontal direction towards or away from the object and image plane, while simultaneously adjusting the focal length by movement of lens pair 39, 40, a simple, compact, low-cost system is enabled. A preferred mechanical arrangement for achieving this simultaneous pair of motions is shown in FIG. 4.

Figure 4:
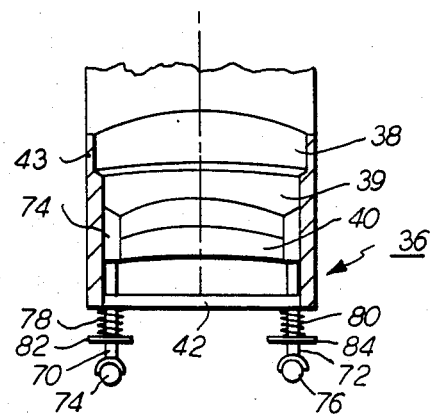
FIG. 4 shows a preferred mechanical arrangement for providing simultaneous lens assembly and lens element motion in the FIG. 3 system.

As shown in FIG. 4, assembly 30 is modified by attaching rods 70, 72 to frame 74 of lens pair 39, 40. Rods 70, 72 are slidably mounted through an aperture in the ends of reflector 42. Cam followers 74, 76 are mounted at the ends of rods 70, 72 and springs 78, 80 are mounted between fixed plate 82, 84 and the back side of reflector 42.

Figure 5:
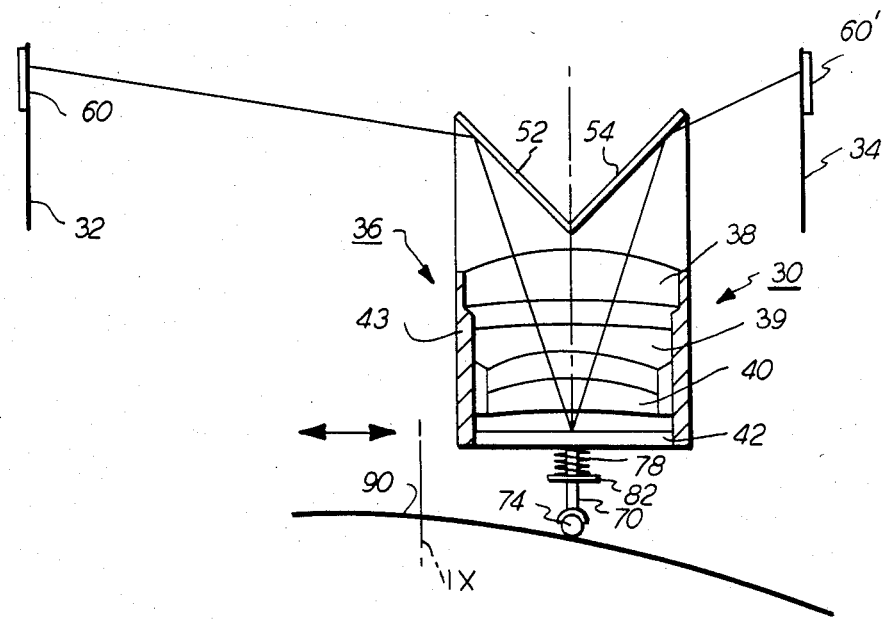
FIG. 5 shows the preferred arrangement of FIG. 4 utilized in a reduction mode.

FIG. 5 shows lens assembly of FIG. 4 rotated 90° about the optical axis, with cam follower member 74 resting on symmetrical cam surface 90. The lens assembly is shown in a reduction position (to the right of the center of the cam surface which represents the 1X magnification position.) As the assembly is moved to the left or right (by means not shown) the lens assembly is placed in an enlargement or reduction mode, respectively. Travel in either direction will result in lens pair 39, 40 moving towards reflector 42 as shown in FIG. 5. The shape of cam surface 90, symmetrical about the 1X point, can be calibrated to the movement of the lens pair so as to continually adjust the focal length of the lens.

Figure 6:
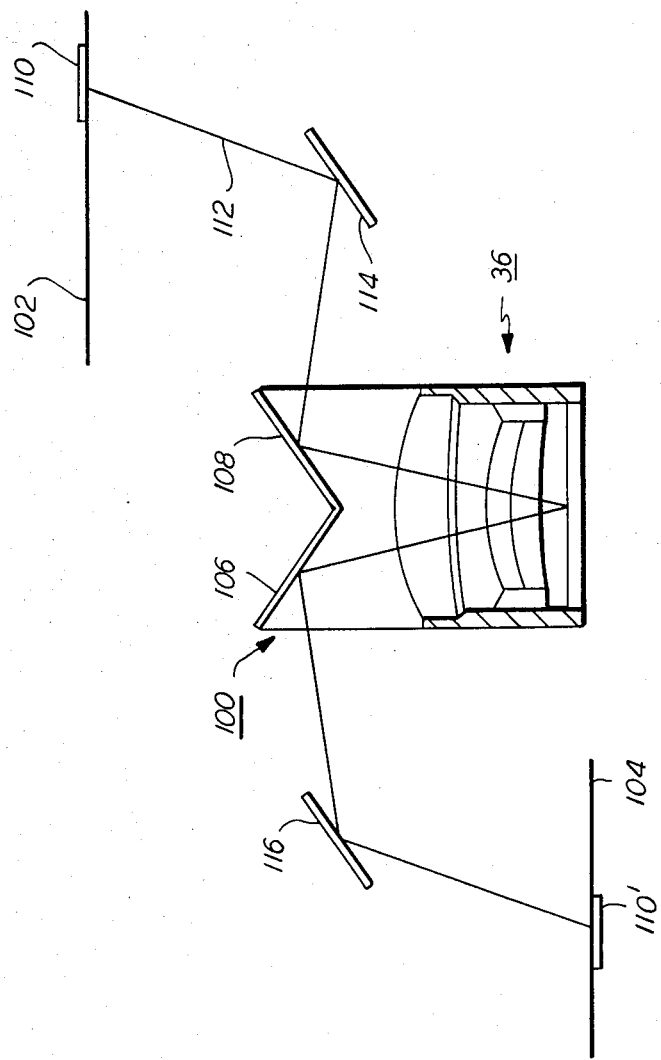
FIG. 6 shows the lens assembly of the present invention in a folded optical system.

An alternate embodiment of the invention for an optical system requiring a folded configuration is shown in FIG. 6. In this figure, reflector lens assembly 100 is positioned between an object plane 102 and an image plane 104. Assembly 100 differs from assembly 30 in FIG. 3 in that plane mirrors 106, 108 are not orthogonal to each other but rather form an angle greater than 90°. Light reflected from illuminated object 100, represented by a principal ray traveling along system axis 112, is first reflected from a first fixed folding mirror 114 and then from plane mirror 108 into lens 36. The rays are reflected back out through the lens, and reflected by plane mirror 106 to second folding mirror 116 and then onto image plane 104 forming image 110'. The configuration of FIG. 6 represents a general system; in a variation, mirrors 114 and 108 can be so arranged that the principal ray path between them is perpendicular to the optical axis of the lens. This ensures that the object and image points remain stationary as the lens travels to a new position.

In order to avoid tilting of the focal plane, avoid keystoning effects and maintain rectilinearity of object and image, mirrors 114, 108 and 116 must be positioned parallel to each other such that the path of the principal rays between the folding mirrors and the plane mirrors is parallel to the object and image plane. If this condition is achieved then the principal angles which the principal rays are making with the object and image plane will be the same as the lens offset angle.

With any of the above embodiments, it is understood by those skilled in the art that documents can be placed in the object plane and moved in a scanning direction in synchronism with a photoconductive imaging plane.

In conclusion, it may be seen that there has been disclosed an improved optical imaging system. The exemplary embodiments described herein are presently preferred, however, it is contemplated that further variations and modifications within the purview of those skilled in the art can be made herein. The following claims are intended to cover all such variations and modifications as fall within the spirit and scope of the invention.

What is claimed is:

1. An optical system for projecting an image of an object at an object plane onto an image plane at a plurality of magnifications, said system including a lens assembly having the following elements in alignment along the lens optical axis;
    a fixed outer lens element,
    at least one movable lens element spaced from said outer element and movable along said optical axis,
    a reflector spaced from said movable element,
    a first and second reflective element positioned proximate to said fixed outer lens element, said first and second reflective elements joined together to form at least a right angle, said optical axis intersecting said angle, said system further including means for moving said lens assembly between said object and image planes, while simultaneously moving said movable lens element along said lens optical axis.

2. The optical system of claim 1, said simultaneous moving means including a cam follower attached to said movable lens element, said cam follower cooperating with a cam surface during lens movement so as to change the axial position of said lens element thereby changing the lens focal length.

3. The optical assembly of claim 1 further including a first folding mirror positioned between said object plane and said lens element and a second folding mirror positioned between said lens element and said image plane, said first and second mirror lying in a plane parallel to at least one of said reflective elements whereby a principal ray makes an angle with respect to the object and image planes which is equal to the offset angle between said reflective elements.

* * * * *